United States Patent
Rossini (10) Patent No.: US 9,703,137 B2
(45) Date of Patent: Jul. 11, 2017

(54) REAR PROJECTION DISPLAY SCREEN AND DEVICE

(71) Applicant: Commissariat à l'énergie atomique et aux énergies alternatives, Paris (FR)

(72) Inventor: Umberto Rossini, Coublevie (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 82 days.

(21) Appl. No.: 14/831,740

(22) Filed: Aug. 20, 2015

(65) Prior Publication Data

US 2016/0054618 A1    Feb. 25, 2016

(30) Foreign Application Priority Data

Jul. 31, 2015 (EP) .................................. 15179415

(51) Int. Cl.
| | | |
|---|---|---|
| *G02F 1/1335* | (2006.01) | |
| *G02F 1/1343* | (2006.01) | |
| *G03B 21/62* | (2014.01) | |
| *G03B 21/10* | (2006.01) | |
| *G03B 21/26* | (2006.01) | |

(52) U.S. Cl.
CPC .... *G02F 1/133504* (2013.01); *G02F 1/13439* (2013.01); *G02F 1/134309* (2013.01); *G03B 21/62* (2013.01); *G03B 21/10* (2013.01); *G03B 21/26* (2013.01)

(58) Field of Classification Search
CPC .......................... G02F 1/133504; G03B 21/62
See application file for complete search history.

(56) References Cited

U.S. PATENT DOCUMENTS

| | | | | |
|---|---|---|---|---|
| 5,886,762 A * | 3/1999 | Lee | ............... | G02F 1/134363 349/139 |
| 6,839,117 B1 * | 1/2005 | Park | ............... | G02F 1/134363 349/141 |
| 7,656,585 B1 * | 2/2010 | Powell | ............... | G02B 5/09 349/11 |
| 2004/0240053 A1 * | 12/2004 | Shimoda | ............... | G03B 21/62 359/449 |
| 2006/0171027 A1 * | 8/2006 | Shinbo | ............... | G03B 21/10 359/454 |
| 2008/0204612 A1 * | 8/2008 | Komitov | ............... | G02F 1/134363 349/23 |

(Continued)

OTHER PUBLICATIONS

Wen-Chi Hung et al, "Sensistive voltage-dependent diffraction of a liquid crystal Fresnel lens", Apr. 10, 1999, pp. 2094-2098, vol. 48, No. 11 of Applied Optics, Optical Society of America, Washington, DC USA.

(Continued)

*Primary Examiner* — Sang V Nguyen
(74) *Attorney, Agent, or Firm* — Kevin R. Erdman; Brannon Sowers & Cracraft PC (57) ABSTRACT

The present invention involves a rear projection display screen, including: a transmissive diffuser; a liquid crystal layer arranged on the rear surface side of the diffuser; and on the side of a first surface of said layer, first and second alternated parallel conductive strips regularly distributed across the entire surface of the screen, the first strips being interconnected, and the second strips being interconnected without being connected to the first strips.

20 Claims, 3 Drawing Sheets

(56) References Cited

U.S. PATENT DOCUMENTS

| | | | | |
|---|---|---|---|---|
| 2008/0260336 A1* | 10/2008 | Hwang | ............... | G02B 6/0053 385/120 |
| 2009/0231548 A1* | 9/2009 | Kondo | ................... | G03B 21/62 353/20 |
| 2010/0195202 A1* | 8/2010 | Masalkar | ............... | G03B 21/60 359/460 |
| 2011/0134349 A1* | 6/2011 | Wu | .................... | G02F 1/13781 349/34 |
| 2013/0215503 A1* | 8/2013 | Hosoi | .................... | G03B 21/62 359/453 |
| 2014/0016052 A1* | 1/2014 | Yang | .................. | G02F 1/13306 349/34 |
| 2014/0240825 A1* | 8/2014 | Okumura | ............... | G03B 21/62 359/453 |
| 2016/0170225 A1* | 6/2016 | Getin | .................... | G02B 27/48 359/599 |

OTHER PUBLICATIONS

Institut National de la Proriete Industrielle, Rapport de Rechereche Preliminaire for French Application 14/57966, May 12, 2015.

* cited by examiner

REAR PROJECTION DISPLAY SCREEN AND DEVICE

CROSS-REFERENCE TO RELATED APPLICATIONS

The present application claims priority under 35 U.S.C. §119(e) of French patent application number 14/57966, filed on Aug. 25, 2014, and European Patent application serial number 15179415.3, filed Jul. 31, 2015, the disclosures of which are incorporated by reference herein.

BACKGROUND OF THE INVENTION

Field of the Invention

The present disclosure relates to a rear projection display screen and to a rear projection display device comprising such a screen. More particularly, the present disclosure relates to a rear projection display screen and device capable of being integrated in a vehicle passenger compartment.

Description of the Related Art

Rear projection designates the projection of images on a surface of a transmissive screen, which will be called hereafter, by convention, the rear surface of the screen, for the viewing of images on the opposite surface of the screen, which will be called front surface of the screen hereafter. It has already been provided to use rear projection display devices to provide information in passenger compartments of vehicles, for example, of cars. Such devices may for example be integrated in the central console of a car, or also above this central console. However, rear projection display devices integrated in vehicle passenger compartments are subject to significant constraints. Such devices should in particular be relatively compact, sufficiently directional to avoid light projections towards reflective elements such as the windshield, and should generate a light flow and an output contrast which are sufficient to avoid problems of readability when the vehicle is placed under a lighting of high luminosity, for example, from the sun. In particular, problems may arise when the image projected on the screen should be able to be seen under an angle different from the normal to the screen, for example, when the screen is located on the central console of a car and the image should be able to be seen by the driver and/or by a front-seat passenger sitting next to the driver.

It would be desirable to have a rear projection display screen and a rear projection display device overcoming all or part of the disadvantages of known rear projection display screens and devices.

SUMMARY

Thus, an embodiment provides a rear projection display device, comprising a screen and a light source, wherein the screen comprises: a transmissive diffuser; a liquid crystal layer arranged on the rear surface side of the diffuser; and on the side of a first surface of said layer, first and second alternated parallel conductive strips regularly distributed across the entire surface of the screen, the first strips being interconnected, and the second strips being interconnected without being connected to the first strips, and wherein the light source is capable of projecting an image on the back of the screen.

According to an embodiment, the first conductive strips and the second conductive strips respectively form the teeth of first and second electrodes in the form of interdigitated combs.

According to an embodiment, the teeth of the first and second electrodes are parallel to the width of the screen, and have a length approximately equal to the width of the screen.

According to an embodiment, the teeth of the first and second electrodes are regularly distributed along the entire length of the screen.

According to an embodiment, in front view, the teeth of the first and second electrodes are separated two by two by a strip of said layer.

According to an embodiment, the screen further comprises, on the side of a second surface of said layer opposite to the first surface, third and fourth electrodes in the form of interdigitated combs, the comb teeth of the third electrode being located opposite the comb teeth of the first electrode, and the comb teeth of the fourth electrode being located opposite the comb teeth of the second electrode.

According to an embodiment, the electrodes are transparent.

According to an embodiment, the diffuser has a diffusion angle smaller than or equal to 30 degrees.

According to an embodiment, the distance separating two first neighboring parallel conductive strips is at least ten times the greatest wavelength emitted by the source.

According to an embodiment, the source is capable of emitting in a wavelength range from 100 to 1,500 nm.

Another embodiment provides a method of controlling a device of the above-mentioned type, comprising applying a non-zero voltage between the first and second conductive strips, capable of generating in said layer, between two neighboring strips, a graded index of refraction profile parallel to the mean plane of said layer and orthogonal to said strips.

In several of the embodiments, the rear projection display device comprises a screen (500) and a light source, wherein the screen (500) comprises: a transmissive diffuser (501); a liquid crystal layer (503) arranged on the rear surface side of the diffuser (501); and on the side of a first surface of the layer (503), first and second alternated parallel conductive strips are regularly distributed across the entire surface of the screen, the first strips being interconnected, and the second strips being interconnected without being connected to the first strips. The light source is capable of projecting an image on the back of the screen (500). The first conductive strips and the second conductive strips respectively may form the teeth of first (615) and second (616) electrodes in the form of interdigitated combs. The teeth of the first (615) and second (616) electrodes may be parallel to the width of the screen (500), and have a length approximately equal to the width of the screen (500). The teeth of the first (615) and second (616) electrodes may be regularly distributed along the entire length of the screen (500). In a front view, the teeth of the first (615) and second (616) electrodes are separated two by two by a strip of the layer (503). The screen (500) may further comprise, on the side of a second surface of the layer (503) opposite to the first surface, third (617) and fourth (618) electrodes in the form of interdigitated combs, the comb teeth of the third electrode (617) being located opposite the comb teeth of the first electrode (615), and the comb teeth of the fourth electrode (618) being located opposite the comb teeth of the second electrode (616). The electrodes (615, 616, 617, 618) may be transparent. The diffuser (501) may have a diffusion angle smaller than or equal to 30 degrees. The distance separating two first neighboring parallel conductive strips may be at least ten times the greatest wavelength emitted by the source. The source may be capable of emitting in a wavelength range from 100 to 1,500 nm. A method of controlling such a device of may comprise the following steps: applying a non-zero voltage between the first and second conductive strips, capable of generating in the layer (503), between two neighboring strips, a graded index of refraction profile parallel to the mean plane of the layer (503) and orthogonal to the strips.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiments disclosed below is/are not intended to be exhaustive or limit the invention to the precise form disclosed in the following detailed description. Rather, the embodiment is chosen and described so that others skilled in the art may utilize its teachings.

For clarity, the same elements have been designated with the same reference numerals in the various drawings and, further, the various drawings are not to scale. Further, in the following description, unless otherwise indicated, terms "approximately", "substantially", "around", and "in the order of" mean "to within 20%", and terms referring to directions, such as "lateral", "under", "above", "upper", "lower", "topping", etc. apply to devices arranged as illustrated in the corresponding views, it being understood that, in practice, the devices may have different directions.

Figure 1:
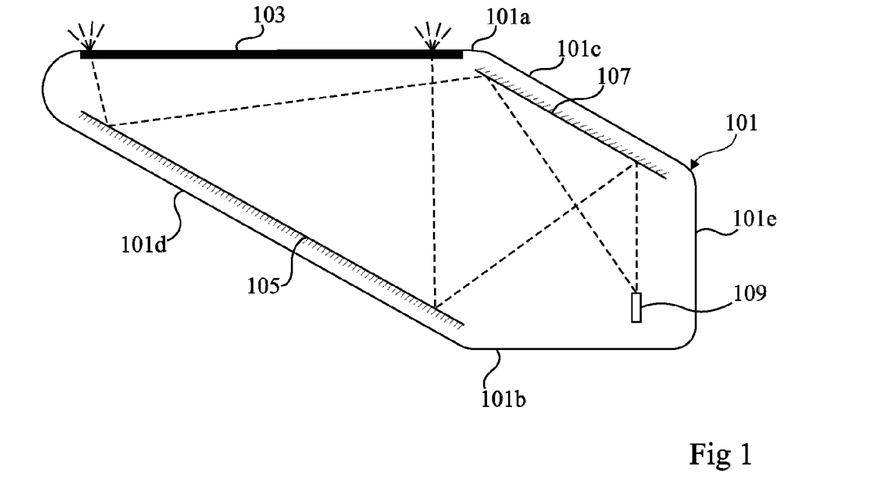
FIG. 1 is a simplified cross-section view of an example of a rear projection display device.

FIG. 1 is a simplified cross-section view of an example (non-limiting) of a rear projection display device capable of being integrated in the passenger compartment of a vehicle, for example, in the central console of a motor vehicle.

The device of FIG. 1 comprises a package 101 defining an enclosure having projection elements of the device integrated therein. In this example, package 101 has the general shape of a parallelepiped truncated along a plane parallel to one of its edges. In FIG. 1, five walls 101a, 101b, 101c, 101d, and 101e of package 101 can be seen. Wall 101a corresponds to a first surface of the parallelepiped, wall 101b corresponds to a second truncated surface of the parallelepiped, parallel to wall 101a, wall 101c corresponds to a third truncated surface of the parallelepiped, forming an obtuse angle with wall 101a, and wall 101d corresponds to a fourth surface of the parallelepiped, parallel to wall 101c, forming an acute angle with wall 101a. Wall 101e connects wall 101b to wall 101c in the parallelepiped truncating plane and forms, in this example, an approximately straight angle with wall 101b.

Package 101 comprises an outlet opening in wall 101a, having a rear projection display screen 103 positioned therein. The rear surface of screen 103, intended to receive an image projected by a light source, faces the inside of package 101, while its front surface, intended to be seen by a user, is directed towards the outside of the package.

Inside of the package are arranged two planar reflective mirrors 105 and 107 respectively positioned along wall 101d and along wall 101c, and a light source 109, for example, a mobile laser scan source, a miniaturized LED video projector, etc., approximately positioned in the angle between walls 101b and 101e. Source 109 is arranged to illuminate mirror 107, so that the beam reflected by mirror 107 reaches mirror 105 and that the beam reflected by mirror 105 illuminates the rear surface of screen 103.

Figure 2:
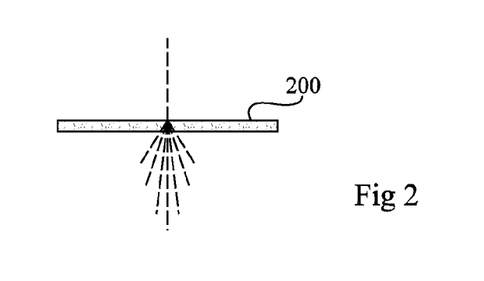
FIG. 2 is a simplified cross-section view of an example of a rear projection display screen.

FIG. 2 is a cross-section view schematically showing an example of a rear projection display screen 200. Screen 200 is essentially formed of a transmissive diffuser, that is, a sheet, plate, or film transmitting to its front surface the light illuminating its rear surface, by more or less strongly diffusing this light. Generally, the output cone of the diffuser is centered on the propagation direction of the light illuminating its rear surface, that is, when the diffuser receives, on its rear surface side, a light beam under a normal incidence, the intensity of the beam emitted by the diffuser on its front surface side is maximum along an axis normal to the screen, and decreases as the propagation angle of the diffused light deviates from the normal to the screen.

In a rear projection display device integrated in the central console of the passenger compartment of a vehicle, a problem which arises is that the image should be able to be seen under an angle different from the normal to the screen, for example, by the driver or by both the driver and a front-seat passenger. When a screen of the type described in relation with FIG. 2 is used, in order for the image perceived by the driver and/or the front-seat passenger to be sufficiently bright, a relatively strong light source and a diffusing screen having its output cone exhibiting a relatively large angular aperture (or diffusion angle), for example, greater than or equal to 50° should be provided. This results in a significant electric power consumption. Further, parasitic reflections capable of disturbing the driver may occur.

Figure 3A:
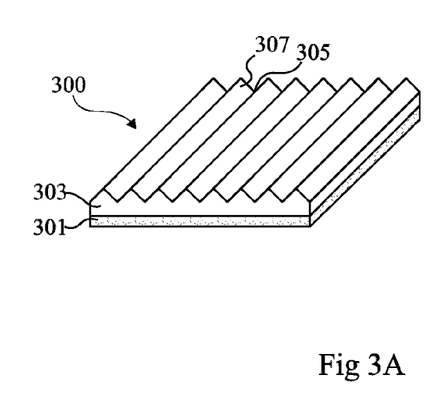
FIGS. 3A to 3C schematically show another example of a rear projection display screen.
Figure 3B:
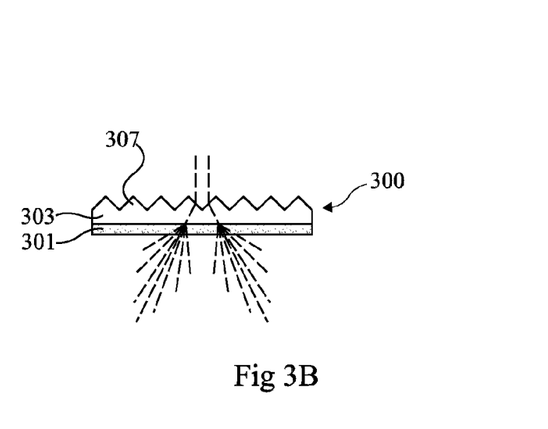
Figure 3C:
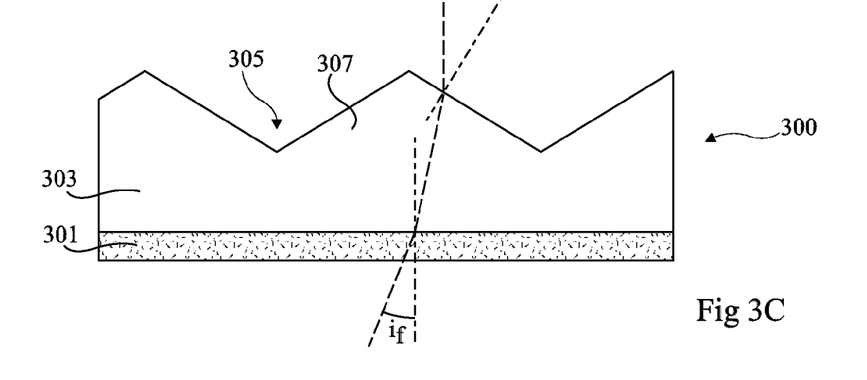

FIGS. 3A to 3C schematically show another example of a rear projection display screen 300. FIG. 3A is a perspective view of screen 300, FIG. 3B is a cross-section view of screen 300, and FIG. 3C is an enlarged partial cross-section view of screen 300. Screen 300 further comprises a transmissive diffuser 301 of the type described in relation with FIG. 2. Screen 300 further comprises, placed against the rear surface of diffuser 301, a transparent film 303 having its surface opposite to diffuser 301 (that is, the surface facing the light source or rear surface) comprising ridges 305 having a triangular cross-section defining prisms 307. In the shown example, ridges 305 are parallel and extend across the entire width of screen 300 with a constant pitch. In this example, prisms 307 defined between the lateral walls of ridges 305 are all substantially identical and have, in cross-section, the shape of isosceles triangles. In this example, the bases of prisms 307 (bases of the isosceles triangles) define a continuous planar surface parallel to diffuser 301 and having dimensions substantially identical to those of diffuser 301.

When an image is projected onto the rear surface of screen 300, if the pitch of the prisms is small enough with respect to the image resolution, for each of the image pixels, part of the light corresponding to the pixel is deviated leftwards by an angle if (in the orientation of FIGS. 3B and 3C), and the remaining part is deviated rightwards by an angle if (in the orientation of FIGS. 3B and 3C). At the output of diffuser 301, the light corresponding to a given pixel of the image is thus distributed between two diffusion cones centered on different axes which are not orthogonal to the screen. It should be noted that in a rear projection display device using such a screen, an optical system (not shown) enabling to control the angle of incidence of the light projected on the screen, for example, a Fresnel lens, may be provided between the projection elements and the rear surface of the screen.

The use of a screen with prisms of the type described in relation with FIGS. 3A to 3C in a rear projection display device integrated in the central console of the passenger compartment of a vehicle enables to make the image projected on the screen visible both by the driver and by the passenger, with an improved efficiency between the power emitted by the light source and the luminosity perceived by the user as compared with devices using a screen of the type described in relation with FIG. 2. An advantage is that the total light power emitted at the diffuser output can be decreased. Further, the diffusion angle of diffuser 301 may be decreased with respect to the case of a screen of the type described in relation with FIG. 2. As an example, the diffusion angle of diffuser 301 may be selected to be smaller than or equal to 30°. This enables to limit risks of parasitic reflections likely to disturb the driver.

However, a problem which is posed is that, in such a rear projection display device, the distribution of the projected light flow is determined by the geometry of the prisms and cannot be modified.

It would be desirable to have a rear projection display device where the preferred projection angles of the images can be controlled to be modified. This would for example enable to adapt the projection mode according to the number of passengers in the vehicle and to their positions in the vehicle.

According to an aspect of an embodiment, a rear projection display screen is provided, which comprises a liquid crystal layer operating in transmission mode, provided with electrodes arranged to enable to apply, in strips parallel to the width of the screen of the liquid crystal layer, graded indexes of refraction profiles approximately parallel to the mean plane of the layer and orthogonal to the screen width. As will be explained in further detail hereafter, such index gradients cause a deviation, in the direction of the gradients, of the light crossing the liquid crystal layer. Varying the voltages applied to the electrodes enables to control the index gradients, which enables to control the angles of deviation of the light by the liquid crystal layer.

The behavior of light crossing a medium having a graded index of refraction should first be reminded. When the crossed medium has an index gradient only in a direction parallel to the light propagation direction, the light propagation direction is not modified. However, when the index gradient has a transverse component, that is, perpendicular to the light propagation direction, the light propagation direction tends to be modified, curving towards the region of higher index. Radius of curvature R of the trajectory at a given point is proportional to refraction index n at this point and inversely proportional to the transverse component of the index gradient at this point, which may be expressed by the following formula:

$$\frac{1}{R} = \frac{1}{n}\vec{e_n} \cdot \overrightarrow{\text{grad}}(n)$$

$\vec{e_n}$ and $\overrightarrow{\text{grad}}(n)$ respectively being the unit vector perpendicular to the propagation direction at the considered point and the index gradient vector at the considered point, and scalar product $\vec{e_n}$, $\overrightarrow{\text{grad}}(n)$ corresponding to the transverse component of the index gradient at the considered point.

As a result, when a light beam crosses, widthwise, a liquid crystal layer having its index varying parallel to the mean plane of the layer, this beam is all the more deviated as the index gradient is large. Further, the deviation is a progressive curving of the light trajectory, so that angle α between the propagation direction at the inlet of the liquid crystal layer and the propagation direction at the outlet of the liquid crystal layer depends on thickness e of the crossed layer.

Figure 4:
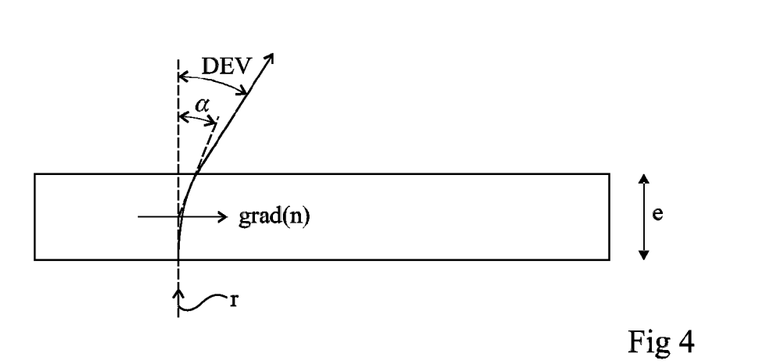
FIG. 4 is a diagram illustrating the refractive behavior of a liquid crystal layer having a transverse index gradient.

FIG. 4 schematically shows the deviation of a light ray r orthogonal to the liquid crystal layer, generated by the existence of an index gradient grad (n) in the mean plane of the liquid crystal layer. In FIG. 4, the distances and the angles are exaggerated to better illustrate the phenomenon. At the outlet of the liquid crystal layer, an additional deviation is generated due to the change of index when it is passed outside of the liquid crystal layer. The total deviation between the incoming ray (perpendicular to the layer) and the outgoing ray is indicated by angle DEV. By simplifying the calculations, it can be considered that angle α is approximately equal to (e/n)*grad (n), and that angle DEV is approximately equal to e*grad (n). The index which is considered herein is the average index across the thickness of the liquid crystal layer, since the index is not necessarily constant across the entire thickness of the layer, particularly due to the anchoring of the liquid crystals in a specific alignment direction at the front and rear surfaces of the liquid crystal layer.

Figure 5:
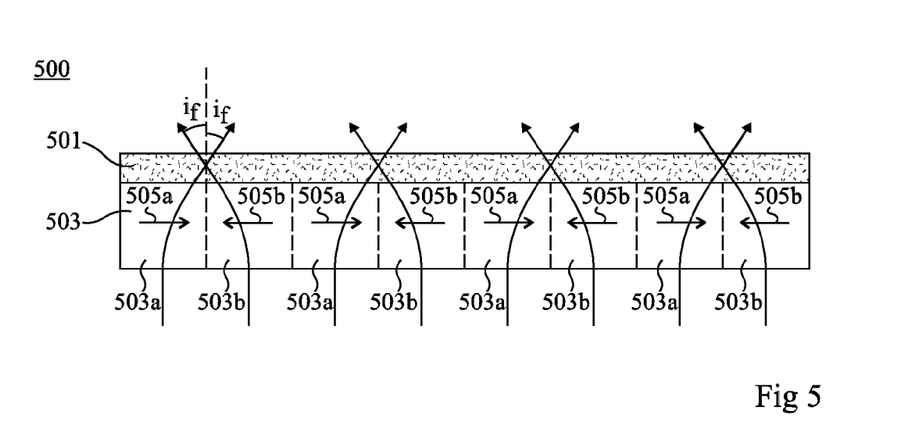
FIG. 5 is a cross-section view schematically illustrating the operating principle of an embodiment of a rear projection display screen.

FIG. 5 is a cross-section view schematically illustrating the operating principle of an embodiment of a rear projection display screen 500 comprising a liquid crystal layer where transverse index gradients are applied to control the preferred angle(s) of deviation of light.

Screen 500 for example has a rectangular general shape. Screen 500 comprises a transmissive diffuser 501, for example of the type described in relation with FIG. 2. Diffuser 501 preferably has a relatively small angle of diffusion, for example, smaller than or equal to 30° and preferably smaller than or equal to 20°.

Screen 500 further comprises, on the rear surface side of diffuser 501, a liquid crystal layer 503 parallel to diffuser 501, extending across approximately the entire surface of the screen. In this example, layer 503 comprises an alternation of regions 503a and 503b in the form of strips parallel to the screen width, having a length substantially equal to the screen width, regularly spaced apart along the entire screen length. In the shown example, strips 503a and 503b are considered to have substantially the same dimensions, and are placed against one another, thus occupying the entire surface of layer 503. Layer 503 is provided, on its front surface and/or on its rear surface, with electrodes, not shown, enabling to apply, in each strip 503a, a same transverse index gradient (that is, parallel to the mean plane of layer 503) 505a, and, in each strip 503b, a same transverse index gradient 505b having a direction opposite to that of gradient 505a. In this example, gradients 505a and 505b are perpendicular to the length of strips 503a and 503b (that is, perpendicular to the screen width). In the shown example, gradient 505a is oriented from left to right, that is, in strips 503a, the refraction index increases from the left-hand side to the right-hand side of the screen (in the orientation of FIG. 5), and gradient 505b is oriented from right to left, that is, in strips 503b, the refraction index increases from the right-hand side to the left-hand side of the screen (in the orientation of FIG. 5). In the shown example, in absolute value, index gradients 505a and 505b approximately have the same value.

When an image is projected on the rear surface of screen 500, if the pitch of strips 503a and 503b is sufficiently small as compared with the image resolution, for each of the image pixels, part of the light corresponding to the pixel crossing a strip 503a, and is accordingly deviated by an angle if to the right (in the orientation of FIG. 5), and another part of the light corresponding to the pixel crosses an adjacent strip 503b, and is accordingly deviated by an angle if to the left (in the orientation of FIG. 5). Coming out of diffuser 501, the light corresponding to a given pixel of the image is thus distributed between two diffusion cones centered on distinct axes which are not orthogonal to the screen. It should be noted that in a rear projection display device using such a screen, an optical system (not shown) enabling to control the angle of incidence, on screen 500, of the light rays projected by the source (not shown), for example, a Fresnel lens, may be provided between the projection elements and the rear surface of the screen. Preferably, the optical system is such that all the light rays projected by the source reach the rear surface of layer 503 under an approximately normal incidence.

Liquid crystal layer 503 of screen 500 thus achieves a function of deviation and separation of the light flow similar or identical to that achieved by microprism film 303 of screen 300 of FIGS. 3A to 3C. More particularly, in the example of FIG. 5, each pair of neighboring strips 503a, 503b carries out a function similar to that of a prism 307 of screen 300 of FIGS. 3A to 3C.

Screen 500 substantially has the same advantages as screen 300 of FIGS. 3A to 3C, and has as an additional advantage that its preferred image projection angle(s) are not set, and may be modified by appropriately controlling liquid crystal layer 503. As an example, by increasing or decreasing the values of index gradients 505a and 505b, it is possible to increase or to decrease the angles of the deviations caused by strips 503a and 503b of layer 503. Further, by canceling out index gradients 505a and 505b, the image projection light flow may be oriented towards the inside of the vehicle.

Figure 6A:
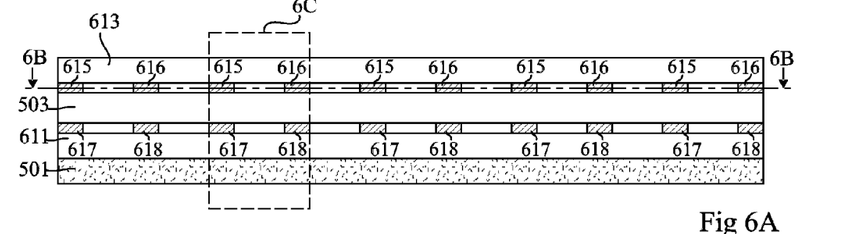
FIGS. 6A to 6C schematically show an embodiment of a rear projection display screen.
Figure 6B:
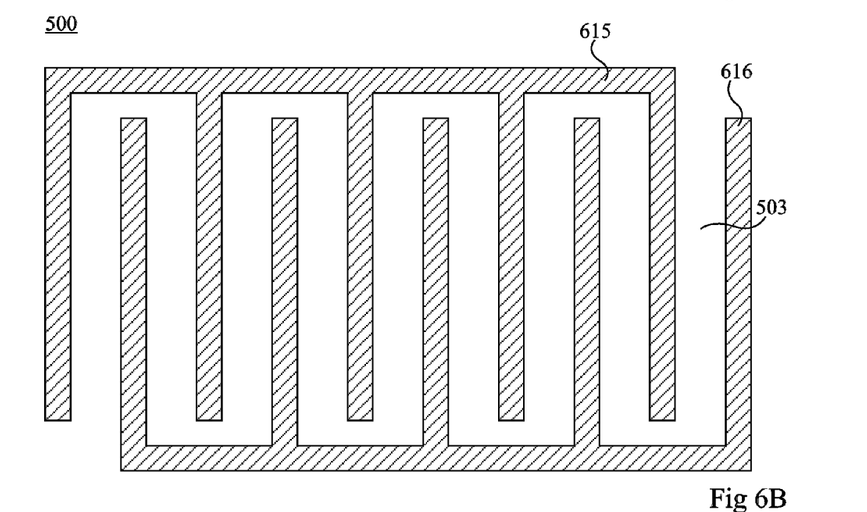
Figure 6C:
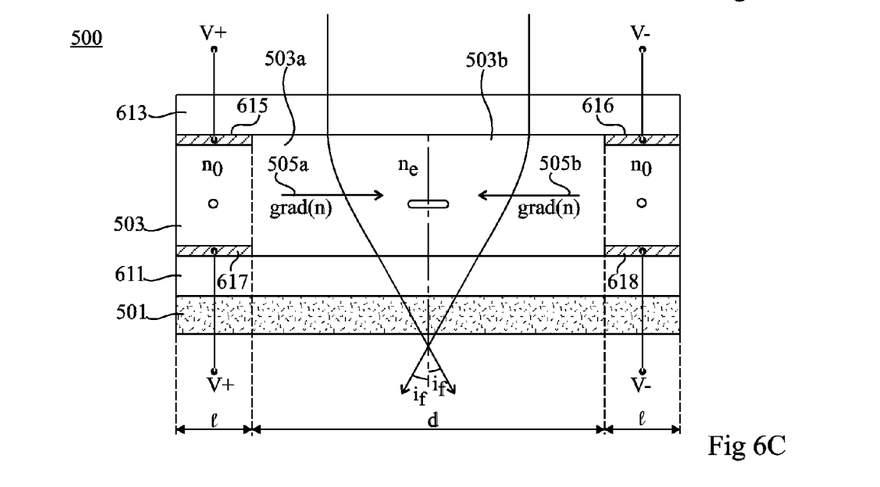

FIGS. 6A to 6C illustrate in more detailed fashion an embodiment of screen 500 of FIG. 5. More particularly, FIG. 6A shows a lengthwise cross-section view of screen 500, FIG. 6B shows a cross-section view of screen 500 along plane 6B of FIG. 6A, and FIG. 6C shows an enlargement of a portion 6C of FIG. 6A.

As indicated hereabove, screen 500 comprises a transmissive diffuser 501. As an example, diffuser 501 may be a cylindrical lenticular lens of the type described in article "A dual-directional light-control film with a high-sag and high-asymmetrical-shape micro-lens array fabricated by a UV imprinting process" of Ta-Wei Lin et al. Other types of diffusers may however be used, for example, a diffuser of the type sold by LUMINIT under name "Light Shaping Diffuser", a holographic diffuser, etc.

In this example, screen 500 comprises, coating the rear surface of diffuser 501, an assembly comprising two parallel transparent plates (for example, glass) 611 and 613, defining a sealed cavity into which is arranged liquid crystal layer 503. In the shown example, plate 611 is located on the front surface side of layer 503, and plate 613 is located on the rear surface side of layer 503. A thin layer of glue, not shown, may be provided between the rear surface of diffuser 501 and the front surface of layer 611.

In this example, plate 613 supports, on its front surface side, an electrode 615 and an electrode 616, each comprising a plurality of strips approximately parallel to the screen width and having a length approximately equal to the screen width. The strips of electrodes 615 and 616 are alternated and regularly distributed along the entire screen length. As illustrated in FIG. 6B, electrodes 615 and 616 have, in front view, the shape of interdigitated combs, the strips parallel to the screen width of electrodes 615 and 616 corresponding to the comb teeth. Further, in this example, plate 611 supports, on its rear surface side, an electrode 617 and an electrode 618, each comprising a plurality of strips approximately parallel to the screen width and having a length approximately equal to the screen width, the strips of electrodes 617 and 618 being alternated and regularly distributed along the entire length of the screen. In this example, electrodes 615 and 617 on the one hand, and 616 and 618 on the other hand, have approximately the same shape and are located opposite one another, that is, in projection perpendicularly to the screen, electrodes 615 and 617 approximately coincide and electrodes 616 and 618 approximately coincide. Electrodes 615, 616, 617, and 618 are preferably made of transparent conductive material, for example, of indium-tin oxide (ITO).

FIG. 6C illustrates an example of operation of screen 500. It is considered as an example (non-limiting) that in the absence of a polarization, the liquid crystals are aligned parallel to the teeth of comb electrodes 615, 616, 617, and 618. To obtain this alignment, layers made of an alignment polymer (not shown) may respectively coat the front surface and the rear surface of liquid crystal layer 503. More generally, any other liquid crystal alignment element may be provided.

In this example, a same potential V+ is applied to electrodes 615 and 617, and a same potential V−, lower than potential V+, is applied to electrodes 616 and 618.

The portions of layer 503 located between two opposite strips of electrodes 615 and 617 are submitted to a zero voltage perpendicularly to layer 503, and accordingly have a minimum refraction index no which corresponds to the ordinary index of the liquid crystal layer. Similarly, the portions of layer 503 located between two opposite strips of electrodes 616 and 618 are submitted to a zero voltage perpendicularly to layer 503, and thus have a refraction index approximately equal to $n_o$.

However, each portion of layer 503 located, in top view, between two neighboring strips of electrodes 615 and 616 (or, in bottom view, between two neighboring strips of electrodes 617 and 618) is submitted, parallel to the mean plane of layer 503 and perpendicularly to the screen width, to a non-zero voltage V+−V. Thus, each portion of layer 503 located, in top view, between two neighboring strips of electrodes 615 and 616 comprises two areas 503a and 503b having opposite index gradients 505a and 505b parallel to the mean plane of layer 503 and perpendicularly to the screen width. In this example, the maximum refraction index is obtained in a central junction area between areas 503a and 503b. In this central area, layer 503 has an index ne greater than no. If voltage V+−V− is sufficiently high, the liquid crystals in the central junction area are aligned parallel to the means plane of layer 503 and perpendicularly to the comb electrode teeth, index ne then corresponding to the extraordinary index of the liquid crystal layer.

The value of the gradient in areas 503a and 503b depends on distance d between neighboring areas of electrodes 615 and 616, the maximum gradient capable of being reached being equal to $2*(n_e-n_o)/d$, where $n_o$ and $n_e$ respectively designate the ordinary index and the extraordinary index of layer 503.

The portions of layer 503 located between two opposite strips of electrodes 615 and 617 or between two opposite strips of electrodes 616 and 618 do not have a transverse index gradient, and thus do not deviate the light crossing them. Calling 1 the width of the teeth of electrodes 615, 616, 617, and 618, the proportion of the light flow which is not deviated by the liquid crystal layer is approximately equal to 100*l/(l+d) (in percents). The remaining portion (100*d(l+d) %) will be deviated for half to the left and for half to the right (in the orientation of FIG. 6C), by an angle if approximately equal to $e*2*(n_e-n_o)/d$ radians, where e designates the thickness of layer 503.

Various alternative control methods may be provided to obtain different distributions of the projected light flow. As an example, to obtain an asymmetrical distribution of the light flow, it may be provided to apply a potential V+ to electrode 617, a potential V− lower than potential V+ to electrode 615, a potential v+ higher than potential V− and lower than potential V+ to electrode 616, and a potential v− lower than potential v+ to electrode 618, potentials V+, V−, v+ and v− being such that voltage V+−V− between electrodes 617 and 615 is higher than voltage v+−v− between electrodes 616 and 618, and that voltage v+−V− between electrodes 616 and 615 is equal to voltage V+−v− between electrodes 617 and 618.

More generally, according to the desired distribution of the light flow, a plurality of parameters may be adjusted, such as the potentials applied to the electrodes, the tooth width of the comb electrodes, the spacing between the teeth of the comb electrodes, the thickness of the liquid crystal layer, and the type of alignment of the liquid crystals.

It should be noted that in the embodiments described in the present patent application, the light deviation achieved by the liquid crystal layer is a refractive deviation, and not a diffractive deviation of the type generally provided in optical systems based on liquid crystal diffractive gratings, for example, gratings of the type described in article "High-spatial-frequency Liquid Crystal Phase Gratings with Double-sided Striped Electrodes" of Lanlan Gu et al. (SPIE Vol. 5741). To obtain a diffractive-type deviation, particularly enabling to separate the incident beam into two beams having different propagation directions, the electrode pitch, that is, distance d between two neighboring teeth of a same comb electrode, is preferably greater than a plurality of times the wavelength of the light emitted by the light source (or the greatest wavelength emitted by the light source in the case of a source emitting at a plurality of wavelengths). In a preferred embodiment, the electrode pitch is at least ten times the largest wavelength emitted by the light source. As a non-limiting example, the light source emits in a visible or near-visible wavelength range, for example, in a wavelength range from 100 to 1,500 nm.

As a non-limiting example, the thickness of the liquid crystal layer is in the range from 5 to 25 μm, and the width of the comb electrodes is in the range from 1 to 10 μm, and distance d between two neighboring teeth of the comb electrodes is in the range from 10 to 50 μm.

The manufacturing of screen 500 has the advantage of being relatively simple since it cannot be implemented by conventional liquid crystal device manufacturing steps.

Specific embodiments have been described. Various alterations, modifications, and improvements will readily occur to those skilled in the art.

In particular, although embodiments where liquid crystal layer 503 is provided with electrodes on its front surface side and on its rear surface side, it will be within the abilities of those skilled in the art to obtain the desired operation by providing electrodes only on the front surface side of layer 503 or on its rear surface side only.

Further, the above-described embodiments are compatible not only with planar screens, but also with screens having curved shapes.

Further, based on the above-described embodiments, it will be within the abilities of those skilled in the art, without showing any inventive step, to add layers, sheets, films, or additional plates to the screen stack, to implement other functions, for example, one or a plurality of antireflection layers.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A rear projection display device, comprising a screen and a light source, wherein the screen comprises:
   a transmissive diffuser;
   a liquid crystal layer arranged on the rear surface side of the diffuser; and
   on the side of a first surface of the liquid crystal layer, first and second alternated parallel conductive strips regularly distributed across the entire surface of the screen, the first strips being interconnected, and the second strips being interconnected without being connected to the first strips, and
   wherein the light source is capable of projecting an image on the back of the screen a rear surface of the screen; and
   wherein the screen generates a light flow of preferred images to a viewer, and projection angles of different distributions of the projected light flow are modifiable by appropriately controlling the values of index gradients of the liquid crystal layer by a refractive deviation.

2. The device of claim 1, wherein the first conductive strips and the second conductive strips respectively form the teeth of first and second electrodes in the form of interdigitated combs.

3. The device of claim 2, wherein the teeth of the first and second electrodes are parallel to the width of the screen, and have a length approximately equal to the width of the screen.

4. The device of claim 3, wherein the teeth of the first and second electrodes are regularly distributed along the entire length of the screen.

5. The device of claim 2, wherein, in front view, the teeth of the first and second electrodes are separated two by two by a strip of the liquid crystal layer.

6. The device of claim 2, wherein the screen further comprises, on the side of a second surface of the liquid crystal layer opposite to the first surface, third, fourth electrodes in the form of interdigitated combs, the comb teeth of the third electrode being located opposite the comb teeth of the first electrode, and the comb teeth of the fourth electrode being located opposite the comb teeth of the second electrode.

7. The device of claim 1, wherein said electrodes are transparent.

8. The device of claim 1, wherein the diffuser has a diffusion angle smaller than or equal to 30 degrees.

9. The device of claim 1, wherein the distance separating two first neighboring parallel conductive strips is at least ten times the greatest wavelength emitted by the source.

10. The device of claim 1, wherein the source is capable of emitting in a wavelength range from 100 to 1,500 nm.

11. A method of controlling rear projection display device, the device comprising a screen and a light source, wherein the screen comprises: a transmissive diffuser; a liquid crystal layer arranged on the rear surface side of the diffuser; and on the side of a first surface of the liquid crystal layer, first and second alternated parallel conductive strips regularly distributed across the entire surface of the screen, the first strips being interconnected, and the second strips being interconnected without being connected to the first strips, wherein
the light source is capable of projecting an image on a rear surface of the screen, the screen generates a light flow of preferred images to a viewer, and projection angles of different distributions of the projected light flow are modifiable by appropriately controlling the values of index gradients of the liquid crystal layer by a refractive deviation,
the method comprising the steps of:
applying a non-zero voltage between the first and second conductive strips, and
generating in said layer, between two neighboring strips, a graded index of refraction profile parallel to the mean plane of said layer and orthogonal to said strips.

12. The method of claim 11, wherein the first conductive strips and the second conductive strips respectively form the teeth of first and second electrodes in the form of interdigitated combs.

13. The method of claim 12, wherein the teeth of the first and second electrodes are parallel to the width of the screen, and have a length approximately equal to the width of the screen.

14. The method of claim 13, wherein the teeth of the first and second electrodes are regularly distributed along the entire length of the screen.

15. The method of claim 12, wherein, in front view, the teeth of the first and second electrodes are separated two by two by a strip of the liquid crystal layer.

16. The method of claim 12, wherein the screen further comprises, on the side of a second surface of the liquid crystal layer opposite to the first surface, third, fourth electrodes in the form of interdigitated combs, the comb teeth of the third electrode being located opposite the comb teeth of the first electrode, and the comb teeth of the fourth electrode being located opposite the comb teeth of the second electrode.

17. The method of claim 11, wherein said electrodes are transparent.

18. The method of claim 11, wherein the diffuser has a diffusion angle smaller than or equal to 30 degrees.

19. The method of claim 11, wherein the distance separating two first neighboring parallel conductive strips is at least ten times the greatest wavelength emitted by the source.

20. The method of claim 11, wherein the source is capable of emitting in a wavelength range from 100 to 1,500 nm.

* * * * *

UNITED STATES PATENT AND TRADEMARK OFFICE
CERTIFICATE OF CORRECTION

PATENT NO. : 9,703,137 B2  
APPLICATION NO. : 14/831740  
DATED : July 11, 2017  
INVENTOR(S) : Umberto Rossini Page 1 of 1

It is certified that error appears in the above-identified patent and that said Letters Patent is hereby corrected as shown below:

On the Title Page

Item (30) Foreign Application Data please insert --FR 14/57966 August 25, 2014--.

Signed and Sealed this
Second Day of January, 2018

Joseph Matal
*Performing the Functions and Duties of the
Under Secretary of Commerce for Intellectual Property and
Director of the United States Patent and Trademark Office*